United States Patent [19]

Ovnicek

[11] Patent Number: 5,727,633
[45] Date of Patent: Mar. 17, 1998

[54] HORSESHOE FOR TREATMENT OF LAME HORSES

[76] Inventor: Eugene D. Ovnicek, 525 Halfmoon Rd., Columbia Falls, Mont. 59912

[21] Appl. No.: 505,917

[22] Filed: Jul. 24, 1995

Related U.S. Application Data

[60] Division of Ser. No. 138,952, Oct. 18, 1993, Pat. No. 5,439,062, and a continuation-in-part of Ser. No. 947,140, Sep. 18, 1992, Pat. No. 5,253,715.

[51] Int. Cl.$^6$ .................................................. A01L 1/04
[52] U.S. Cl. .................................................. 168/24; 168/4
[58] Field of Search .................................. 168/4, 14, 24

[56] References Cited

U.S. PATENT DOCUMENTS

| | | | |
|---|---|---|---|
| 171,421 | 12/1875 | Purdy | 168/10 |
| 196,479 | 10/1877 | Read | 168/24 |
| 322,861 | 7/1885 | Starkweather | 168/28 |
| 329,141 | 10/1885 | Claude | 168/4 |
| 427,183 | 5/1890 | Murphy | 168/24 |
| 483,537 | 10/1892 | Chapman | 168/24 |
| 586,030 | 7/1897 | Hallanan | 168/28 |
| 660,427 | 10/1900 | Hallanan | 168/28 |
| 685,769 | 11/1901 | Kent | 168/28 |
| 772,427 | 10/1904 | Symons | 168/14 |
| 1,050,526 | 1/1913 | Downs et al. | 168/28 |
| 1,140,851 | 5/1915 | Robins | 168/33 |
| 1,212,601 | 1/1917 | Anthony | 168/31 |
| 1,407,379 | 2/1922 | Caryl | 168/28 |
| 1,702,882 | 2/1929 | Tweed | 168/4 |
| 3,023,812 | 3/1962 | Swartz | 168/24 |
| 3,153,452 | 10/1964 | Mancini | 168/24 |
| 3,548,947 | 12/1970 | Mackay-Smith | 168/29 |
| 3,907,036 | 9/1975 | Capone | 168/28 X |
| 4,333,532 | 6/1982 | Mennick | 168/24 |
| 4,721,165 | 1/1988 | Ovnicek | 168/24 |
| 5,165,481 | 11/1992 | Duckett | 168/4 |
| 5,368,104 | 11/1994 | Duckett | 168/4 |

FOREIGN PATENT DOCUMENTS

| | | | |
|---|---|---|---|
| 457588 | 9/1913 | France | 168/29 |

OTHER PUBLICATIONS

Horseshoeing Theory and Hoof Care; Leslie Emery, Jim Miller and Nyles Van Hoosen; 1977; pp. 32, 52, 57, 66–67, 83, ?, 210, 204, 19.

*Primary Examiner*—Robert P. Swiatek
*Assistant Examiner*—Elizabeth Shaw
*Attorney, Agent, or Firm*—Harry M. Cross, Jr.

[57] ABSTRACT

A horseshoe has a closed end toe section provided with a concave depression in its upper surface and a rearwardly and downwardly beveled portion in its lower surface. The concave depression is provided over an area sufficient to avoid contact with the sole of a horse's foot beneath the tip of the coffin bone. Fullering grooves containing nail holes along the branches of the shoe are located at the periphery of the branches, outwardly of the concave depression

8 Claims, 3 Drawing Sheets

HORSESHOE FOR TREATMENT OF LAME HORSES

RELATED APPLICATION

This application is a division of application Ser. No. 08/138,952, filed Oct. 18, 1993, U.S. Pat. No. 5,439,062 which is a continuation-in-part of application Ser. No. 07/947,140, filed Sep. 18, 1992, now U.S. Pat. No. 5,253,715.

FIELD OF THE INVENTION

The invention relates generally to the field of farriery and more particularly to a horse shoe design for horse's hooves which is to be used in the treatment of founder and laminitis and other hoof and lower leg ailments in horses.

BACKGROUND OF THE INVENTION

Veterinarians and farriers are well acquainted with the varieties of lameness problems in horses. Two particularly vexing ailments of the hoof and lower leg are founder and laminitis, conditions which involve partial or complete separation of the coffin bone and inner hoof wall.

Treatment of laminitis and founder requires that several aspects of the problem be considered. One is that the fever created by the founder and the accompanying trauma causes the coffin bone and the hoof wall to disconnect or separate one from the other in whole or in part. A second condition is that the inflammation results in contraction of the flexor tendons which in turn tends to pull the coffin bone away from the inner face of the hoof wall. Thirdly, the downward pressure resulting from the horse's own weight causes rotation or displacement of the coffin bone. This bone displacement is aggravated by pressure applied to the toe of the hoof.

Hoof pads and various types of shoes have been designed to alleviate pain to the animal caused by founder and laminitis and to assist in the treatment process. So far as in known, however, no devices for hoof wear have been designed that have proven to be effective other than the hoof pad and shoe combination described in the above-identified application of which this is a continuation-in-part.

SUMMARY OF THE INVENTION

The invention comprises a hoof pad designed to support the center of a horse's foot and further comprises the combination of the hoof pad and horseshoe which raises the horse's heel and at the same time supports the frog and the bars and, hence, the coffin bone. The pad is preferably wedge-shaped to be higher at the heel and lower at the toe. An insert frog support is located on the bottom of the pad such that it presses upwardly from the ground line to give support to the center of the foot, including the frog and the bars and the coffin bone. The shoe portion of the remedial hoof pad and shoe combination is provided with elevated heels thus raising the hoof heel to relax the flexor tendon. Relaxing the flexor tendon reduces pull on the coffin bone.

The present remedial horseshoe and pad combination is specifically directed to laminitis (founder) conditions. The present invention provides a rim shoe that carries elevated heels, and a full pad that carries a longitudinally-placed elongated frog insert wedge. The elevated heels have a height and length sufficient to support the hoof with the horse's heel elevated to release tension on the horse's flexor tendon. As such, the elevated heels must have enough length to support the hoof with the heel elevated; a typical "heel caulk" or "heel grab" that is intended to provide traction would not be preferred inasmuch as such would dig into soft terrain and not support the hoof with the heel elevated. The frog insert wedge extends from the rear edge of the shoe pad to about the center of the pad. It is constructed and arranged with respect to the elevated heels such that the front tip of the frog insert protrudes down below the shoe ground contact line. Also, the frog insert is elongated so that it generally underlies the length of the frog. Consequent of this structure, when a horse stands on a hoof shod with this combination, the elevated heels will elevate the rear of the foot and the front tip of the frog insert will be pressed up against the frog to compress it upward and thereby support the coffin bone. Moreover, when the horse picks the shod foot up, ground pressure against the frog insert will be removed and the pressure, exerted by the frog insert, against the frog and the bars of the foot will be released so that the frog and the adjacent sole areas will relax thereby aiding normal blood circulation through the foot. In order for this combination to be effective, both the elevated heels and the frog insert must be elongated. Merely supporting the frog adjacent to the heel region of the foot would not be adequate because the elevated heels remove that part of the foot from ground contact; and a "short" frog insert would not extend far enough forward toward the center of the shod foot so that the insert would be exposed and protrude down below the ground contact line so that it could press the shoe pad up against the frog.

Accordingly, it is among the features of the invention to provide a remedial shoe that is designed specifically to allow a horse to move even though its hoof is afflicted with laminitis or founder. The shoe is uniquely simple but effective and long lasting. Replaceable heels are provided to elevate the heel end of the shoe to relieve the flexor tendon from the kind of tension which exerts pull on the coffin bone to separate it from the hoof wall. Nails for the shoe can be placed more to the rear or posterior of the foot and thus further from the traumatized area.

It is furthermore among the features of the invention to provide a remedial full hoof pad that is designed specifically to fully support the center of the frog and the bars of the foot for full support of a lame foot by a rim shoe. The pad offers support for a coffin bone that is wholly or partially separated from the inner surface of the hoof wall. The pad in providing center hoof support for the coffin bone also stimulates the blood supply to the hoof area. This hoof pad has efficacy when use with a plain shoe in the latter stages of treating founder laminitis, for example.

DETAILED DESCRIPTION OF THE INVENTION

Figure 1:
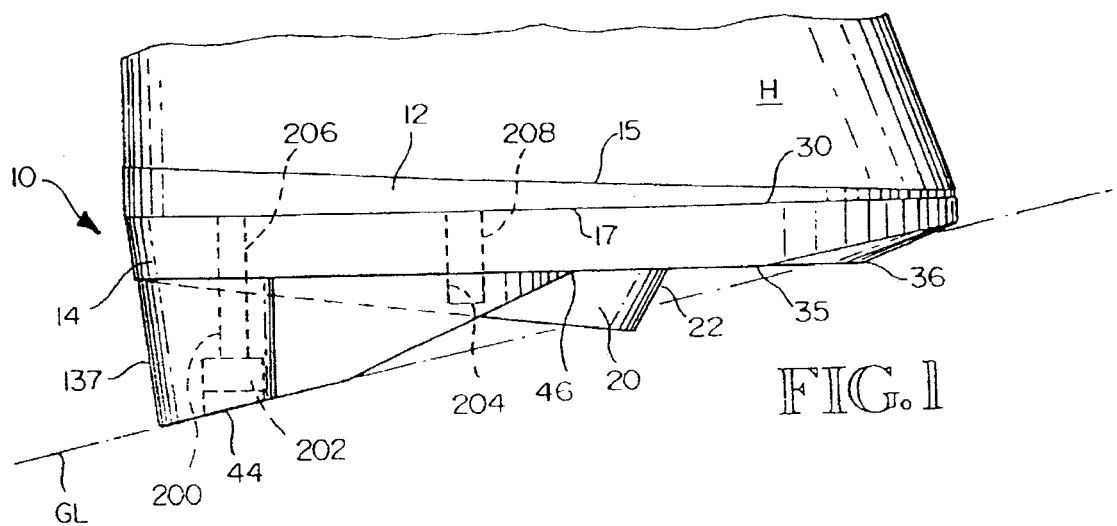
FIG. 1 is a side elevation view of a closed toe—open heel embodiment of the combination shoe and pad as mounted to a horse's hoof.

The hoof pad and shoe combination of this invention are specifically designed for pathology of the equine hoof and leg; specifically those afflicted with a displaced coffin bone as a result of founder laminitis. The use of this combination is not restricted to this pathology since navicular disease, tendon strains, coffin bone fractures, thrush, quarter cracks, and the like have been helped with this hoof pad and shoe combination, or with the hoof pad or the shoe alone.

In cases of laminitis, several things happen. The blood supply to the foot is interrupted for various reasons. The attaching tissue that holds the coffin bone in place within the hoof capsule is affected. Not only the lamina on the dorsal surface of the coffin bone but the surface on the bottom of the coffin bone can be involved. This can involve a very wide range of pathology. This is the reason for the specialized variety of adjustments available with the invention.

Referring now to the drawings it will be seen that the combination hoof pad and horseshoe, generally designated by the number 10, includes pad 12 and shoe 14.

The wedge-shaped pad 12 is thickest at its rear or heel end 16 and narrower at its toe end 18 and the overall shape may be configured to the outside edges of shoe 14 which in turn is shaped to the outside edges of the hoof H. The rear end 16 of pad 12 is, for purposes of illustration, approximately 9/16 inches thick and the front end is approximately 3/32 inches thick at the toe edge. Pad 12 has upper face 15 which contacts the bottom of hoof H and a bottom face 17 on the under side. It can be made of a tough rubber or plastic material which possesses some flexing capability.

Integrally-formed with or securely attached to wedge shaped pad 12 is a wedge shaped frog insert 20 on the ground face of the pad and having inner tip end 22 and rear edge 24. It will be noted from the drawings that the frog insert is shaped like a narrow triangle such that it has nearly straight side edges 26 extending back from front end 22 to rear edge 24, and the inner tip end is rounded. It will be observed from FIG. 2 that frog insert 20 is also wedge shaped, being thinner at its rear edge 24 than at its tip edge 22. In the illustrative drawings, frog insert 20 is approximately 7/16 inches thick at rear edge 24 and about 11/16 inches thick at its inner end 22. Thus, a ground contact surface 25 is defined on frog insert 20 with the inner end 22 being located at a predetermined point under hoof H. Pad 12 may have a taper of 2° to 8°.

Shoe 14 is a full rim device having a planar upper surface a and bottom surface. Shoe 14 may have a closed toe—open heel configuration as shown in FIGS. 1–5. The shoe body 14 is about 3/8 inch thick but may be thinner or thicker as desired and formed of fiberglass, plastic, or of metal such as aluminum or steel.

Figure 2:
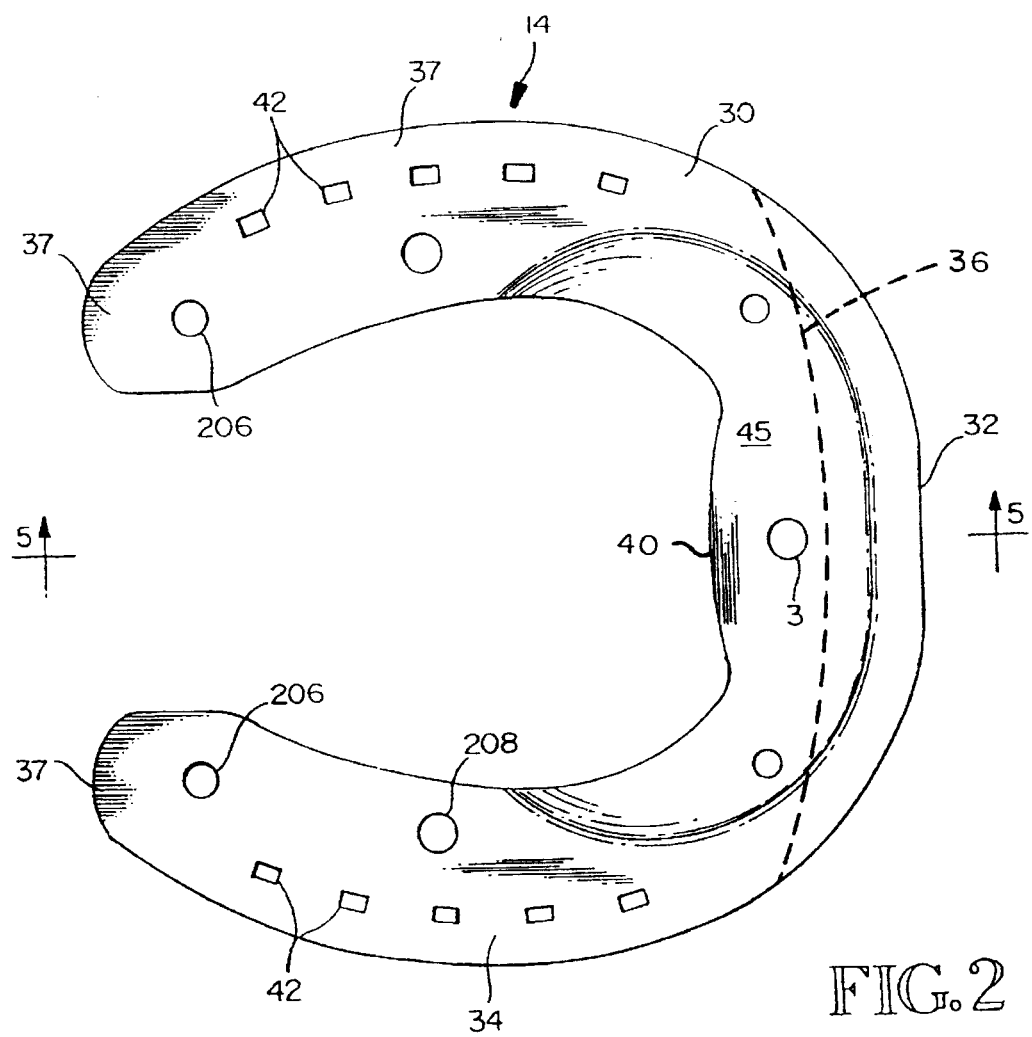
FIG. 2 is a top plan view of the FIG. 1 shoe.
Figure 3:
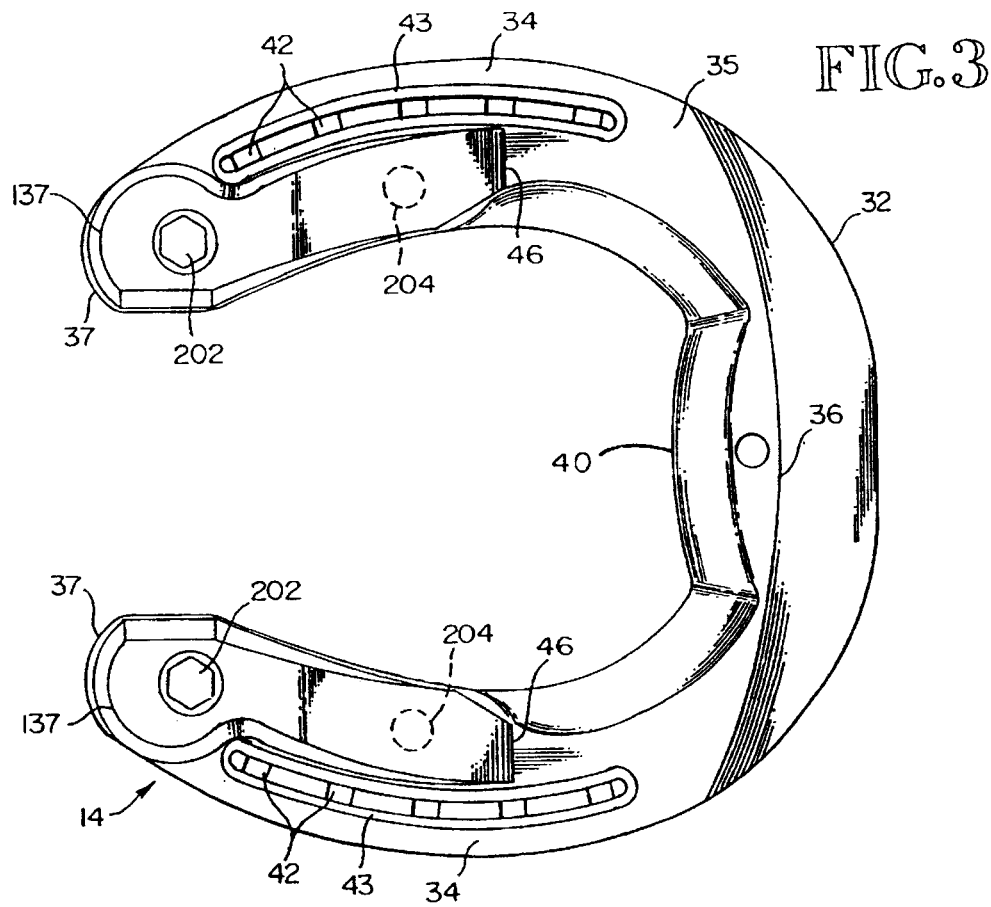
FIG. 3 is a bottom plan view of the FIG. 1 shoe.
Figure 4:
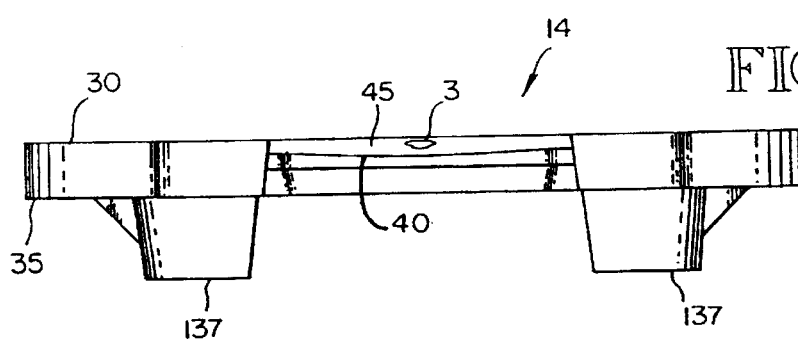
FIG. 4 is a rear end view of the FIG. 1 shoe.
Figure 5:
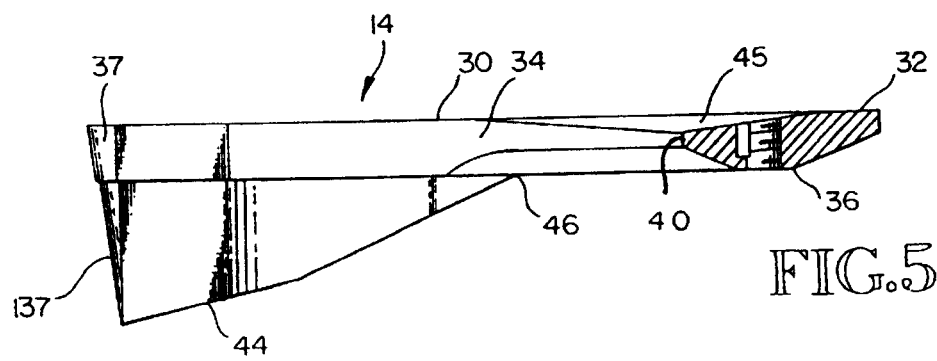
FIG. 5 is a side elevation view of the FIG. 1 shoe taken along the lines 5—5 of FIG. 2.

Shoe 14, as seen is FIGS. 1–5 has planar upper surface 30 and bottom surface 35, a rounded toe portion 32, branch portions 34 and heel portions 37. At the toe the shoe bevels approximately from line 36 to a thickness of about 1/8 inch or less. Also, the toe area contains a concave section 45 on the upper surface with the toe area crowned downwardly on the bottom surface. It will be noted that the toe of body 14 widens at the rear edge to define a rear toe edge 40 such that concave section 45 is actually wider than the remainder of the shoe body sections. Nail holes 42 for the shoe are located generally as shown in FIGS. 1 and 2 within fullering grooves 43. Each heel portion 37 of the shoe portion 14 is provided with a replaceable elevated heel member 137 located preferably inside the nail line, such that a ground contact surface 44 is formed extending to a forward point 46 at about mid-shoe. It will be seen that the rear portion of ground contact surface 44 is generally parallel to the ground contact line GL of the shoe for a distance of 3/4 to 1 inch. Ground contact surface 44 then begins to angle upwardly toward forward point 46. This shoe configuration has a structure that is uniform in width, preferably between about 3/4–1 inch wide, and 5/16–1/2 inch thick. The heel portions are slightly removed on the inner side of the branch at the most rearward ends as shown in FIG. 2. This shoe is quite broad at the toe portion to enable the shoe to be placed more to the rear and still allow the nail holes to fall in proper placement position. The outer leading edge of the shoe at the toe end is beveled to create a roll for ease of breakover. This bevel involves the complete front area of the shoe to its widest point. This shoe is provided with a threaded pad attachment hole 3 along the centerline of the shoe in the middle of the dished-out upper surface 45 so that the toe end of the pad may be screwed to the shoe toe and so that the surrounding portion of the pad may be recessed into the recessed area 45.

The heel members 35, are replaceable. Consequently, the degree of heel elevation of the shoe may be varied by selecting heel members having the desired height. These heel members may vary in height from essentially nothing up to about 1 inch. The heel members are provided in pairs with a left and right heel member in each set. Each heel member 35 is provided with a rearward bolt hole 200 for receiving an attachment bolt 202, and with a forward alignment pin 204 that protrudes upward from the upper surface of the heel member. A corresponding threaded bolt hole 206 and a corresponding pin hole 208 are provided in the bottom surface of the shoe 14. Bolt 202 secures the heel member to the underside of the shoe 14 and pin 204 aligns and stabilizes the heel member. Each heel member comprises an enlarged rearend that contains bolt hole 200 and provides a main ground-bearing surface 212, and a forward-reaching arm that has an arcuate configuration to fit alongside the shoe fullering grooves and provides an declining secondary ground-bearing surface.

Figure 6:
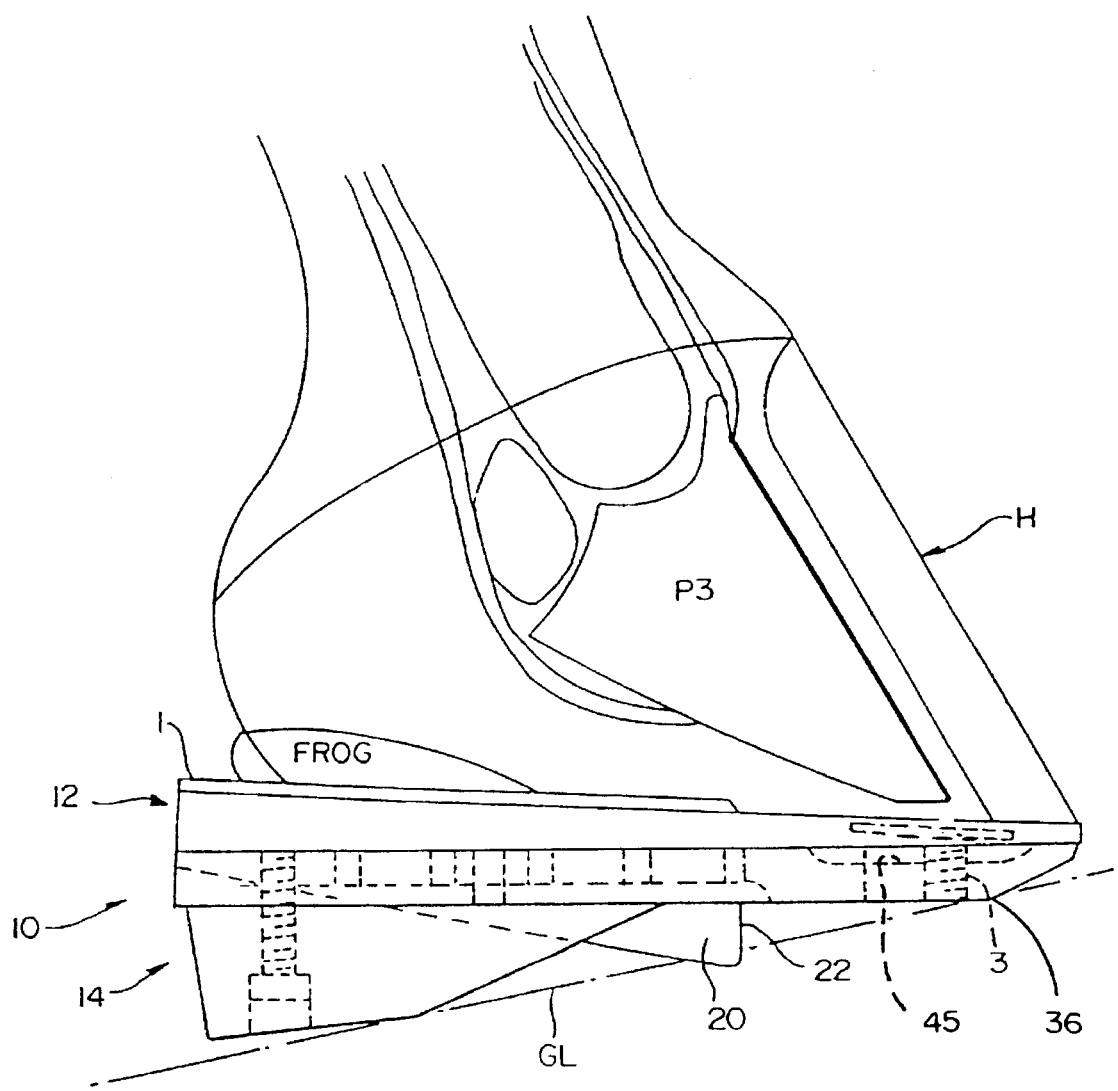
FIG. 6 is a side elevation view of the FIG. 1 hoof pad and shoe as mounted on a horse's foot showing the relationship of the coffin bone (P3) and the frog to the frog insert.

Reference to FIGS. 1 and 6 shows that the forward part of frog insert 20 extends outwardly beyond what would be a straight ground contact line GL when the hoof is in full contact with the ground. It is contemplated that dimensions of the combination of pad and shoe may be varied depending on the treatment needs of a particular horse. Thus, as is shown in the drawings, the forward portion of frog insert 20 when viewed from the side will extend about 1/4 inch past the ground line GL. However, the distance by which the frog insert extends beyond the ground line may be either greater or less.

Frog insert 20 functions to support the coffin bone when the hoof is under load. Placement of the tip 22 must be generally located under the center of the coffin bone. As the hoof is loaded the front (anterior) end of the insert is pressed by the ground up toward the bottom of the hoof. The insert thus forces the pad to flex upwardly to apply upward primary support for the center of the coffin bone. The partial cutout areas at the sides of insert 20 enable the pad to flex more easily. Besides supporting the coffin bone, the insert also provides support for the rest of the subsolar surface. It has also been found that the invention provides stimulation of the vascular system and hence is an aid to blood circulation.

It will be appreciated that pad 12 may be wedged as described or it may be of one thickness but still provided with insert 20. Such flat pads may be used in less severe cases or in later treatment as healing of the hoof progresses.

The heels are raised and tapered forwardly to elevate the heels to relax tendon pull on the coffin bone. The raised ground contact surfaces of the heel members are formed on the inner, rearward edges of the branches so that it is inside the line of the nail holes. Locating the ground contact surface as shown and described reduces stress on medial and lateral movement of the hoof. The nail holes are located more nearly to the posterior portion of the foot away from the traumatized area to give additional freedom to the coffin bone.

The beveled toe section 45 of the open toe shoe of FIGS. 1–5 is designed to span the area directly across the tip of the coffin bone and not extend beyond the lamina tissue at the toe of the hoof. The toe area is widened and made concave on the hoof side as at 38 to provide protection and relief so that the coffin bone does not make contact with either shoe or pad.

Frog insert 20 is located so that it extends approximately ¼ to ¾ inch beyond a line from the last contact point of the heel and the first contact point of the toe. Stated another way, the insert is located so that tip 22 is positioned within ¼ to ¾ inch posteriorly of the anterior of the frog's origin.

Preparing the horse's foot for installation of the hoof pad and shoe combination is important on a horse that has laminitis founder. The hoof wall is trimmed low at the heels to the level and plane of the frog. This process is called "derotating the foot." Special attention is given to not trimming close to the sole ahead of the tip of the frog. Hoof testers are then used to determine the extreme painful areas of the foot, especially specific areas of the frog. When the most painful spot on the frog is determined, the area behind, or to the rear of, this spot is marked. A line is drawn from one side of the foot to the other side, through that spot. The shoe is then fitted to the foot, placing the inner border of the toe from ¾–1 inch forward of the apex, or tip, of the frog. A mark is made on the sole of wall of the hoof at the front edge of the shoe to enable one to attach the shoe and pad assembly in that exact position by use of the reference mark. Marks are then made on each branch of the shoe, using the line drawn across the foot, through the painful spot on the frog, so that the area behind the painful spot can be determined with reference to the shoe's placement. The pad is then attached to the shoe, using the slot in the forward portion of the pad and a flatheaded screw inserted through the slot and threaded into threaded hole 3 in the bottom of the shoe. By means of the length of the slot, the pad can be shifted relative to the shoe so that the tip 22 of the frog insert 20 is in line with the two marks made on each branch of the shoe. The pad is then attached to the underside of the shoe, using a flatheaded attachment screw, or a rivet, that extends through slot into threaded hole 3. By so doing, the portion of the pad overlaying the dished-out portion 45 (in the case of the shoe of FIGS. 1–5) is pulled away from the foot. The shoe is positioned on the foot, using the locator mark made at the toe of the foot, and then attached to the foot by nails or adhesives. This permits the front of the hoof to be free of the shoe but supported centrally by the raised area 1 on the upper side of the pad. This support may be necessary when the foot is loaded under weight-bearing. It is important that the pad apply support directly to the area indicated by the pain response test on the frog. As the horse wears this pad-shoe assembly, it will load the frog first through the downwardly depending frog insert 20 on the ground side of the shoe, and secondly through the raised area 1 on the foot side of the pad. As the frog yields to downward force of the coffin bone, the bars are picked up by the pad surrounding the raised center section 1. The more active the horse becomes, the more the sole participates in supporting the coffin bone.

Heel members can be added when required. The type of heel elevation to be used is determined by the terrain that the horse will traverse and the requirement for relieving pull on the flexor tendon. This will vary from case to case.

FIG. 6 shows the relative relationship between a horse's foot, specifically the coffin bone, P3, and the frog, FROG, with respect to the closed-toe shoe and the frog insert 20. FIG. 17 does the same with respect to the open-toed shoe. In both instances, the tip 22 of the frog insert 20 is located generally underneath the center of the coffin bone. This is usually the point which would be at about or just rearward of the sorest point on the frog as determined by hoof sensitive testing.

While the preferred embodiment of the invention has been described herein, variations in the design may be made. The scope of the invention, therefore, is only to be limited by the claims appended hereto.

The embodiments of the invention in which an exclusive property is claimed are defined as follows:

In the claims:

1. A horseshoe comprising a body member having a closed end toe section means defined by a front toe edge and a rear toe edge and rearwardly extending branch member means with heel sections at the ends thereof, said body member having a planar upper mounting surface and a lower ground-engaging surface; said toe section means containing a recessed section on the upper surface over an area sufficient to avoid contacting the sole of a horse's foot shod with the shoe beneath the tip of the horse's coffin bone said area extending into said branch member means and extending across said toe section means so as to underlay a portion of the hoof wall of the horse's foot; and said toe section means lower surface being beveled downwardly and rearwardly from the front edge of said toe section so as to provide an arcuate breakover line that extends into and between said branches and across said toe section means lower surface underneath said recessed section whereby a major portion of said breakover line extends beneath said recessed section.

2. The horseshoe of claim 1 wherein the shoe body member is provided with fullering grooves containing nail holes along the body member branches, said fuller grooves being located along the outer periphery of said branches outwardly of said concave section; said concave section extending into the forward portions of said branches.

3. The horseshoe of claim 1 wherein said toe section means has an inner edge comprising a mid-portion flanked by two end portions, said end portions making arcuate concave transitions from the mid-portion into said branches, and said mid-portion making a reversed-curve arcuate convex extension between said end portions such that said recessed section bulges inwardly between the body member branches as a consequence of the reversed-curve convex extension so that said recessed section is wider at the toe section center of the mid-portion.

4. The horseshoe of claim 2 wherein said toe section means has an inner edge comprising a mid-portion flanked by two end portions, said end portions making arcuate concave transitions from the mid-portion into said branches, and said mid-portion making a reversed-curve arcuate convex extension between said end portions such that said recessed section bulges inwardly between the body member branches as a consequence of the reversed-curve convex extension so that said recessed section is wider at the toe section center of the mid-portion.

5. The horseshoe of claim 3 wherein said inner edge of said toe section means transitions into inner edges of said body member branches such that said body member branches are of substantially uniform width extending from said toe section means and such that said mid-portion of said toe section means protrudes rearwardly in a pronounced manner as a consequence of said reversed-curve extension of said inner edge.

6. The horseshoe of claim 4 wherein said inner edge of said toe section means transitions into inner edges of said body member branches such that said body member branches are of substantially uniform width extending from said toe section means and such that said mid-portion of said toe section means protrudes rearwardly in a pronounced manner as a consequence of said reversed-curve extension of said inner edge.

7. A horseshoe comprising a body member having a closed end toe section means defined by a front toe edge and a rear toe edge and rearwardly extending branch member means with heel sections at the ends thereof, said body member having a planar upper mounting surface and a lower ground-engaging surface; said toe section means containing a recessed section on the upper surface over an area sufficient to avoid contacting the sole of a horse's foot shod with the shoe beneath the tip of the horse's coffin bone; said toe section means lower surface being beveled downwardly and rearwardly from the front edge of said toe section means so as to provide an arcuate breakover line that extends into and between said branches and across said toe section means lower surface underneath said recessed section whereby a major portion of said breakover line extends beneath said recessed section; and said toe section means having an inner edge comprising a mid-portion flanked by two end portions, said end portions making arcuate concave transitions from the mid-portion into said branch member means, and said mid-portion making a reversed-curve arcuate convex extension between said end portions such that said recessed section bulges inwardly between the body member branches as a consequence of the reversed-curve convex extension so that said recessed section is wider at the toe section center of the mid-portion.

8. The horseshoe of claim 7 wherein said inner edge of said toe section means transitions into inner edges of said body member branches such that said body member branches are of substantially uniform width extending from said toe section means and such that said mid-portion of said toe section means protrudes rearwardly in a pronounced manner as a consequence of said reversed-curve extension of said inner edge.

\* \* \* \* \*